May 9, 1967
H. W. DEANER ETAL
3,319,250
DOUBLE GATE PULSE ENVELOPE MATCHING
SYSTEM FOR A LORAN RECEIVER
Filed June 22, 1965
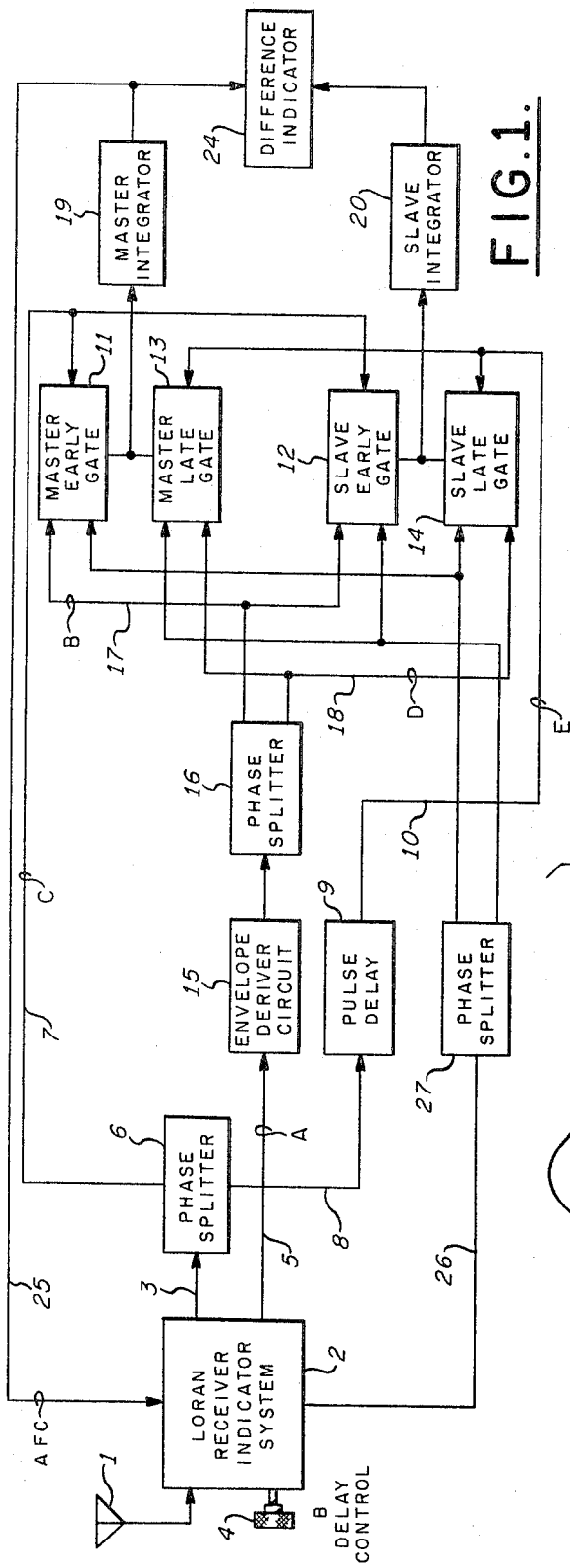
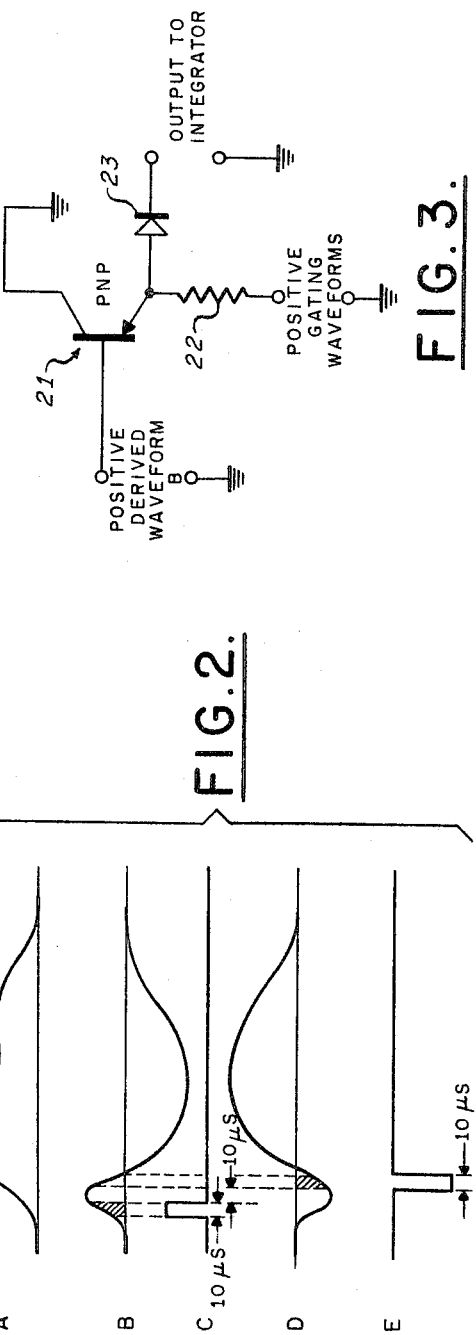
INVENTORS
HAROLD W. DEANER
CHARLES M. WEANT
BY
Robert J. Haase
ATTORNEY

United States Patent Office 3,319,250
Patented May 9, 1967

3,319,250
DOUBLE GATE PULSE ENVELOPE MATCHING SYSTEM FOR A LORAN RECEIVER
Harold W. Deaner and Charles M. Weant, Charlottesville, Va., assignors to Sperry Rand Corporation, Great Neck, N.Y., a corporation of Delaware
Filed June 22, 1965, Ser. No. 465,860
6 Claims. (Cl. 343—103)

The present invention generally relates to pulse envelope matching systems for use in loran receivers. More particularly, the invention is concerned with a double sampling pulse technique for operating upon signals derived from received loran pulses to make a pulse envelope match with high precision.

As is well understood in the loran art, the position of mobile receiving equipment relative to the known locations of two pulse transmitting station pairs is determined by measuring the elapsed time between the receptions of corresponding pulses from each transmitter pair. The elapsed time measurement conventionally is made with the aid of an oscilloscope on which is displayed the pulses received from the master and slave stations comprising a selected transmitting station pair. The loran indicator timing circuits are arranged so that the position of the displayed slave pulse can be changed relative to the position of the displayed master pulse. This is accomplished by providing separate sweep triggers for the master and slave displayed pulses with the slave sweep trigger being controllably delayed relative to the master sweep trigger. The delay of the slave sweep trigger is adjusted until the leading edge of the displayed slave pulse coincides with the leading edge of the displayed master pulse. The term "envelope match" has been employed to describe the condition wherein the leading edges of the displayed slave and master pulses coincide. The determinable delay of the slave sweep trigger relative to the master sweep trigger is a direct measure of the elapsed time between the receptions of the master and slave pulses when an envelope match is achieved.

The prior art technique of visual envelope match produces unsatisfactory results under certain adverse conditions of signal reception. For example, during night time reception, "skywave" signals are received shortly after the ground wave signals from a given transmitted pulse. The almost simultaneous receptions of the two signals causes deformities in the envelope of the desired ground wave signal beginning at a point near its peak and continuing thereafter. The deformity of the desired ground wave signal makes an accurate visual envelope match extremely difficult if not impossible. It has been found necessary to utilize the leading edges of the received master and slave pulses, i.e., those points which precede the peak, in order to achieve envelope match without error attributable to skywave contamination. By definition, the signal amplitude along the pulse leading edge is less than the peak pulse amplitude whereby the effects of noise become more pronounced. In order to distinguish the loran pulse signal from noise so that accurate leading edge envelope match may be accomplished, it becomes necessary to employ more signal integration than is incident to the prior art visual envelope match technique.

It is the principal object of the present invention to provide a highly sensitive pulse envelope matching system responsive to the leading edges of received loran pulses.

Another object is to provide a highly sensitive pulse envelope matching system for seeking a predetermined point of waveforms derived from received loran pulses.

A further object is to provide a highly sensitive pulse envelope matching system for seeking the peak of waveforms derived from received loran pulses.

These and other objects of the present invention are achieved in a preferred embodiment by the provision of means in a loran receiver for generating first and second recurrent pairs of narrow pulses for sampling waveforms derived from master and slave received pulses, respectively. Means are also provided for variably delaying the second pair of pulses with respect to the first pair of pulses. When the first pair of sampling pulses are aligned with their respective master-derived waveform, the controllable delay of the second sampling pulses is adjusted so that the alignment of the second pair of sampling pulses relative to the slave-derived waveform is fully equivalent to the alignment of the first pair of sampling pulses relative to the master-derived waveform.

The alignment of the sampling pulse pairs to their respective derived waveforms is accomplished in the following manner. The signal resulting from the sampling of the master-derived waveform by the first pulse of the respective sampling pulse pair is applied to a master integrating capacitor. The signal resulting from the sampling of the master-derived waveform by the second of said sampling pulse pair also is applied to the master integrating capacitor but in an opposite sense. Proper alignment of the sampling pulse pair to their respective master-derived waveform is evidenced by a net capacitor charge of zero resulting from equal but opposite signal contributions from each of the samplings. In a similar fashion, the signals resulting from the samplings of the slave-derived waveform by its respective sampling pulse pairs are applied to a slave integrating capacitor in opposite senses.

The net signal developed on the master integrating capacitor is utilized as an automatic frequency control voltage which positions the master sampling pulse pair relative to the master-derived waveform in the proper sense and by the proper amount to reduce the master integrating capacitor charge to zero. The signal developed across the master integrating capacitor is compared with the signal developed across the slave integrating capacitor to provide a visual indication of the difference in capacitor potentials. Manual means are provided for positioning the slave sampling pulse pair relative to the master sampling pulse pair in accordance with the said visual indication to reduce the potential difference between the master and slave integrating capacitors towards zero.

In the preferred embodiment, the master and slave-derived waveforms are produced in the same manner. The received master pulse, for example, is differentiated and then subtractively combined with the undifferentiated master pulse, in the manner of U.S. Patent No. 2,946,019, in the name of Robert L. Frank and issued on July 19, 1960, and assigned to the present assignee. The resultant waveform is termed a "derived" pulse and is characterized by unsymmetrical and opposite polarity portions. The portion having the shorter duration occurs first. The sampling gates of the present invention are aligned relative to their respective received master or slave "derived" pulses so that the pulses are symmetrically disposed about the peaks of the earlier occurring portions of the derived pulses. In this case, as described, the contributions of each pair of samplings are oppositely applied to the same respective integrating capacitor. In a second species of the present invention, each sampling pulse pair may be aligned with the zero crossing point of its respective derived pulse merely by combining the contributions of the two sampling gates in the same sense in the same capacitor. In a further modification, the derived waveform which is sampled is produced by simple differentiation of the received master or slave pulse.

For a more complete understanding of the present invention, reference should be had to the following specification and to the appended drawings of which:

FIGURE 1 is a simplified block diagram of a preferred embodiment;

FIGURE 2 is a series of waveforms developed at various points within the embodiment of FIGURE 1; and FIGURE 3 is a schematic showing of a sampling gate circuit suitable for use in the embodiment of FIGURE 1.

Referring now to FIGURE 1, master and slave loran pulses are received by antenna 1 from respective distant transmitting stations (not shown). The received pulses are applied to loran receiver indicator system 2 wherein they are detected. Loran receiver indicator system 2 also provides other functions as described in U.S. Patent No. 2,768,373 issued to Edward Durbin on Oct. 23, 1956, and assigned to the present assignee. As described in said patent, loran receiver indicator system 2 produces on line 3 two recurrent series of sampling pulses having the same recurrence rate but having a variable mutual time phase as determined by the setting of B delay control knob 4. That is, one of the two series of recurrent sampling pulses (slave sampling pulses) may be delayed in controllable and calibrated fashion relative to the other series of sampling pulses (master sampling pulses) by manipulation of the control knob. The recurrent pulses on line 3 correspond to those appearing at the output of driver amplifier 511 of Patent 2,768,373. Loran receiver indicator system 2 further provides on line 5 detected received master and slave pulses. The signals on line 5 correspond to those at the output of phase inverter 425 of Patent 2,768,373. Additionally, system 2 produces a master/slave time interval marking signal on line 26 corresponding to the waveform D of Patent 2,768,373.

In accordance with the present invention, the sampling pulses on line 3 are applied to phase splitter 6 to provide on lines 7 and 8 oppositely poled but otherwise identical recurrent sampling pulses. One of the recurrent pulses on line 7 is shown in waveform C of FIG. 2. The recurrent pulses on line 8 are applied to pulse delay 9 to produce recurrent delayed pulses on line 10, one of which is represented by waveform E of FIG. 2. It will be understood that a pair of recurrent sampling pulses such as the pulse pair of waveforms C and E is produced for each master and each slave received pulse and that the timing of the slave sampling pulse pairs may be controllably delayed relative to the master sampling pulse pairs by manipulation of knob 4. In a typical application, each of the sampling pulses on lines 7 and 10 is of 10 microseconds duration and separated from the other by 10 microseconds. The pulses of line 7 are applied to master early gate 11 and slave early gate 12 whereas the pulses of line 10 are applied to master late gate 13 and slave late gate 14. The master/slave time interval marking signal of line 26 is converted into two oppositely poled but otherwise identical signals by phase splitter 27. One phase of the signal output of splitter 27 is applied jointly to master early gate 11 and slave late gate 14. The other phase of said signal output is applied jointly to master late gate 13 and slave early gate 12. The sampling pulses together with the signals from splitter 27 render the respective sampling gates conductive during the appropriate master/slave interval to pass whatever input signal is applied at the same time. Gates 11 and 13 are rendered conductive solely durring the master pulse interval whereas gates 12 and 14 are rendered conductive solely during the slave pulse interval.

Each of the detected received master and slave pulses on line 5 is operated upon by envelope deriver circuit 15 in the manner of the aforesaid Patent 2,946,019 to provide an output waveform similar to waveform B of FIG. 2. Said waveform B is applied to phase splitter 16 to provide on line 17 the derived waveform represented by waveform B and on line 18 the derived form represented by waveform D of FIG. 2. It will be noted that the derived waveforms B and D are inverses of each other. The derived waveform represented by waveform B is applied jointly by line 17 to master early gate 11 and slave early gate 12. The inverted waveform represented by waveform D is applied by line 18 jointly to master late gate 13 and slave late gate 14. Each of the early and late gate circuits 11, 12, 13 and 14 produces an output signal representing the amplitude of the respective derived waveform B or D during the occurrence of its sampling pulse C or E.

It will be noted that the positive-going portion of waveform B is sampled by positive-going sampling pulse C in gates 11 and 12 whereas the negative-going portion of waveform D is sampled by negative-going sampling pulse E in gates 13 and 14. The polarities of the pulses applied to the gate circuits are chosen so that the output from gate 11 is opposite in polarity to the output of gate 13. The oppositely poled output signals from gates 11 and 13 are applied to master integrator 19. Integrator 19 may take the form of a simple R-C integrating network having a time constant of the order of seconds in a typical instance. The signal outputs from slave early and late gates 12 and 14 are similarly oppositely applied to slave integrator 20.

A preferred circuit for instrumenting each of master early gate 11 and slave early gate 12 is represented in FIG. 3. Referring to FIG. 3, pnp transistor 21 is gated on by the concurrence of the positive sampling pulse C and the positive waveform from splitter 27 which are applied to the emitter via resistor 22. During the time that transistor 21 is rendered conductive by the gating waveforms, the emitter follows the signal then appearing at the base. The base signal is the derived waveform B. The sum of the potentials of the positive gating waveforms is set above the maximum positive excursion of waveform B so that transistor 21 is reliably turned on by the gating waveforms. The signals developed at the emitter of transistor 21 during the occurrence of the sampling pulse C are applied via isolating diode 23 to the master integrator 19. It will be noted that diode 23 as well as transistor 21 is held cut-off between the occurrences of the gating pulses whereby the integrator is isolated from the quiescent operating potentials of transistor 21. In the case of master gate 13 and slave gate 14 which receive waveforms D and E of FIG. 2, the circuit of FIG. 3 is modified by the substitution of an npn transistor for the pnp transistor 21 and by inverting the polarity of diode 23. The signals developed at the emitter of the npn transistor during the occurrence of sampling pulse E are of a polarity opposite to those developed at the emitter of the pnp transistor during the occurrence of sampling pulse C. In this manner, positive and negative pulses are applied in succession to each of the master integrator 19 and slave integrator 20 as a result of the conduction of the respective early and late gate pairs.

The potentials developed at the output of master and slave integrators 19 and 20 are applied to difference indicator 24. The potential at the output of master integrator 19 is also applied by line 25 to loran receiver indicator system 2 for automatic frequency control purposes as described in the aforesaid Patent 2,768,373. As a result of the application of the output of integrator 19 to loran receiver indicator system 2, the timing oscillator component thereof from which the sampling pulses are derived becomes synchronized to the positive peak of the master-derived envelope represented by waveform B. Complete synchronization of the timing oscillator is achieved when the output of the master integrator 19 is reduced toward zero. In conventional servo fashion, if the master-derived envelope of waveform B should tend to drift in time relative to the occurrence of the master sampling pulses applied to gates 11 and 13, an error voltage of proper polarity and magnitude is developed at the output of integrator 19 to restore and maintain synchronization between the timing oscillator and the received master pulses.

An envelope match is achieved when the potential developed by slave integrator 20 is equal to zero or is equal to the potential developed at the output of master integrator 19. Synchronization errors as small as 10 microseconds will cause indicator 24 to provide a visual signal of appropriate sense depending on the direction of the synchronization error.

In the operation of the apparatus of FIG. 1, as in the operation of the system disclosed in Patent 2,768,373, the sampling pulses and the received master and slave pulses are aligned approximately through the use of the conventional loran slow, medium and fast sweep presentations as described in U.S. Patent No. 2,651,033, issued to W. P. Frantz on Sept. 1, 1953, and assigned to the present assignee. The synchronization achieved by means of the sweep presentations is sufficient to put the automatic frequency control system of loran receiver indicator system 2 within its range of operation whereupon the early and late master sampling pulses are caused to be disposed about the positive peak of master derived waveform B so that the signal at the output of integrator 19 is reduced to zero. The proper utilization of the slow, medium and fast sweep presentation also approximately aligns the early and late slave sampling pulses with the slave-derived waveform within the range of operation of difference indicator 24. Final precision adjustment of the timing of the slave sampling pulses relative to the slave-derived wave is accomplished by manipulation of B delay control 4 in the proper direction in order to reduce the indication provided by difference indicator 24 towards zero. In a simple case, indicator 24 may be a zero-centered voltmeter.

It has been found that the precision of synchronization achieved in accordance with the present invention even is sufficient to resolve cyclic ambiguity in a cycle measuring loran system. Cycle measuring systems are those in which an extremely precise measurement of the elapsed time between the arrivals of master and slave pulses is made by phase measurement on the radio frequency carriers of the master and slave pulses. One of the basic problems to be solved in cycle measuring loran receivers is the elimination of cyclic ambiguity. The problem, in short, is to achieve an envelope "match" having a precision which is within ±½ radio frequency cycle of the received loran carrier. The attainment of sufficient envelope match precision is made possible in the present invention through the use of the sampling pulse pairs which seek out and establish a point occurring with the leading edges of the received loran pulses prior to the occurrence of possible skywave contamination. The derived waveform operated upon by the sampling pulse pairs is characterized by a peak of predetermined polarity about which the sampling pulses can be symmetrically aligned as described above. Alternatively, the sampling pulses can be aligned about the zero crossing point of the derived waveform. In the former case, the sampling gate output signals are subtractively combined whereas in the latter case they must be additively combined to provide a comparable visual indication for guiding the manual manipulation of the delay control 4.

An important advantage of the use of sampling pulse pairs in accordance with the present invention is that the transistorized design of the sampling gate circuits such as shown in FIG. 3 is substantially simplified. Each of the sampling gate circuits need pass signals of only a given polarity. For example, the circuit of FIG. 3 is designed to pass only positive polarity signals whereby the collector of the transistorized gate is conveniently grounded to eliminate any tendency of the circuit to drift and also to permit direct current coupling to the long time constant integrator circuits 19 and 20. Additionally, the use of sampling pulse pairs rather than single sampling pulses as in the manner of the prior art yields an error indication of superior sensitivity for a given misalignment of the sampling pulses with respect to the received loran pulses.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a loran receiver responsive to first and second recurrent loran pulses having the same recurrence rate but different time phase, a pulse envelope matching system comprising means connected to receive said first and second pulses for producing first and second waveforms derived from said first and second pulses, respectively, each of said waveforms having the characteristics of a peak of predetermined polarity and a zero crossing point, means for generating first and second recurrent pairs of sampling pulses having the same recurrence rate but said second pair of pulses having a controllable time phase relative to said first pair of pulses, first sampling gate means coupled to receive said first waveform and said first recurrent pair of pulses to provide a first output signal representing the deviation of each of said first pair of pulses relative to one of said characteristics of said first waveform, second sampling gate means coupled to receive said second waveform and said second recurrent pair of pulses to provide a second output signal representing the deviation of each of said second pair of pulses relative to said one of said characteristics of said second waveform, and indicator means coupled to receive said first and second output signals for indicating the difference therebetween.

2. In a loran receiver responsive to first and second recurrent loran pulses having the same recurrence rate but different time phase, a pulse envelope matching system comprising means connected to receive said first and second pulses for producing first and second waveforms derived from said first and second pulses, respectively, each of said waveforms having the characteristic of an earlier occurring peak of one polarity and a later occurring peak of the opposite polarity, means for generating first and second recurrent pairs of sampling pulses having the same recurrence rate but said second pair of pulses having a controllable time phase relative to said first pair of pulses, first sampling gate means coupled to receive said first waveform and said first recurrent pair of pulses to provide a first output signal representing the deviation of each said first pair of pulses relative to said earlier occurring peak of said first waveform, second sampling gate means coupled to receive said second waveform and said second recurrent pair of pulses to provide a second output signal representing the deviation of each said second pair of pulses relative to said earlier occuring peak of said second waveform, and indicator means coupled to receive said first and second output signals for indicating the difference therebetween.

3. A pulse envelope matching system as defined in claim 2 and further including means for applying said first output signal to said means for generating said first and second recurrent pairs of sampling pulses for controlling the recurrence rate thereof.

4. In a loran receiver responsive to first and second recurrent loran pulses having the same recurrence rate but different time phase, a pulse envelope matching system comprising means connected to receive said first and second pulses for producing first and second waveforms derived from said first and second pulses, respectively, each of said waveforms having the characteristics of a peak of predetermined polarity and a zero crossing point, means connected to receive said first and second waveforms for producing third and fourth waveforms, said third waveform being the inverse of said first waveform and said fourth waveform being the inverse of said second waveform, means for generating first and second recurrent pairs of sampling pulses having the same recurrence rate but said second pair of pulses having a controllable time phase relative to said first pair of pulses, each of said first and second pairs of pulses comprising an earlier occurring pulse of a first polarity and a later occurring pulse of the opposite polarity, first sampling gate means coupled to receive said first waveform and said earlier occurring pulse of said first pulse pair, second sampling gate means coupled to receive said third waveform and said later occurring pulse of said first pulse pair, third sampling gate means coupled to receive said second waveform and the earlier occurring pulse of said second pulse pair, fourth sampling gate means coupled to receive said fourth waveform and said later occurring pulse of said second pulse pair, each of said sampling gate means providing a respective output signal representing the deviation of the pulse applied thereto relative to one of said characteristics of the waveform applied thereto, first and second signal integrator means, said first integrator means being coupled to receive the outputs of said first and second sampling gate means and said second integrator means being coupled to receive the outputs of said third and fourth sampling gate means, and difference indicating means coupled to receive the outputs of said first and second signal integrating means.

5. In a loran receiver responsive to first and second recurrent loran pulses having the same recurrence rate but different time phase, a pulse envelope matching system comprising means connected to receive said first and second pulses for producing first and second waveforms derived from said first and second pulses, respectively, each of said waveforms having the characteristic of an earlier occurring peak of one polarity and a later occurring peak of the opposite polarity, means connected to receive said first and second waveforms for producing third and fourth waveforms, said third waveform being the inverse of said first waveform and said fourth waveform being the inverse of said second waveform, means for generating first and second recurrent pairs of sampling pulses having the same recurrence rate but said second pair of pulses having a controllable time phase relative to said first pair of pulses, each of said first and second pairs of pulses comprising an earlier occurring pulse of a first polarity and a later occurring pulse of the opposite polarity, first sampling gate means coupled to receive said first waveform and said earlier occurring pulse of said first pulse pair, second sampling gate means coupled to receive said third waveform and said later occurring pulse of said first pulse pair, third sampling gate means coupled to receive said second waveform and the earlier occurring pulse of said second pulse pair, fourth sampling gate means coupled to receive said fourth waveform and said later occurring pulse of said second pulse pair, each of said sampling gate means providing a respective output signal representing the deviation of the pulse applied thereto relative to said earlier occurring peak of the waveform applied thereto, first and second signal integrator means, said first integrator means being coupled to receive the outputs of said first and second sampling gate means and said second integrator means being coupled to receive the outputs of said third and fourth sampling gate means, and difference indicating means coupled to receive the outputs of said first and second signal integrating means.

6. A pulse envelope matching system as defined in claim 5 and further including means for applying the output of said first signal integrator to said means for generating said first and second recurrent pairs of sampling pulses for controlling the recurrence rate thereof.

References Cited by the Examiner

UNITED STATES PATENTS

| | | | |
|---|---|---|---|
| 2,731,634 | 1/1956 | Palmer | 343—103 |
| 3,044,064 | 7/1962 | Durbin | 343—103 |
| 3,099,835 | 7/1963 | Frank et al. | 343—103 |
| 3,118,109 | 1/1964 | Rabow et al. | 324—68 |

CHESTER L. JUSTUS, *Primary Examiner.*

H. C. WAMSLEY, *Assistant Examiner.*